United States Patent
Zaicevskij

(10) Patent No.: US 9,752,717 B2
(45) Date of Patent: Sep. 5, 2017

(54) STABILIZED PLATFORM FOR CAMERA

(71) Applicant: MY RESEARCH, UAB, Vilnius (LT)

(72) Inventor: Aleksej Zaicevskij, Traku r. (LT)

(73) Assignee: MY RESEARCH, Vilnius (LT)

( * ) Notice: Subject to any disclaimer, the term of this patent is extended or adjusted under 35 U.S.C. 154(b) by 0 days.

(21) Appl. No.: 15/116,618

(22) PCT Filed: Dec. 23, 2014

(86) PCT No.: PCT/LT2014/000015
§ 371 (c)(1),
(2) Date: Aug. 4, 2016

(87) PCT Pub. No.: WO2015/119488
PCT Pub. Date: Aug. 13, 2015

(65) Prior Publication Data
US 2016/0348830 A1    Dec. 1, 2016

(30) Foreign Application Priority Data
Feb. 5, 2014   (LT) ...................................... 2014 012

(51) Int. Cl.
| F16M 11/12 | (2006.01) |
| G03B 17/56 | (2006.01) |
| F16M 11/20 | (2006.01) |
| F16M 11/10 | (2006.01) |
| F16M 11/18 | (2006.01) |

(52) U.S. Cl.
CPC ........... *F16M 11/123* (2013.01); *F16M 11/10* (2013.01); *F16M 11/18* (2013.01); *F16M 11/2071* (2013.01); *G03B 17/561* (2013.01); *F16M 2200/04* (2013.01)

(58) Field of Classification Search
CPC .................................................. F16M 11/123
See application file for complete search history.

(56) References Cited

U.S. PATENT DOCUMENTS

| 8,434,950 | B1 | 5/2013 | Wawro | |
| 2005/0052531 | A1 | 3/2005 | Kozlov et al. | |
| 2009/0257741 | A1* | 10/2009 | Greb | ...................... F16M 13/04 |
| | | | | 396/55 |
| 2010/0188479 | A1 | 7/2010 | Bordignon et al. | |
| 2012/0305741 | A1* | 12/2012 | Sapir | .................... F16M 11/123 |
| | | | | 248/636 |

(Continued)

FOREIGN PATENT DOCUMENTS

| EP | 1 912 015 A2 | 4/2008 |
| FR | 2 715 236 A1 | 7/1995 |

OTHER PUBLICATIONS

International Search Report, dated Jul. 22, 2015, from corresponding PCT Application.

*Primary Examiner* — W B Perkey
(74) *Attorney, Agent, or Firm* — Young & Thompson

(57) ABSTRACT

The invention is related to controlled mechanical platforms for video cameras. A device rotating on a support allows control and stabilization of the position of a camera being rotatable in three dimensions. The construction described above can improve stability of the platform. Vibration level transmitted from the unstable base to the platform is reduced. Areas of application: portable stabilizers for operators, installation of cameras on vehicles, cranes and cables, unmanned machines.

19 Claims, 2 Drawing Sheets

(56) References Cited

U.S. PATENT DOCUMENTS

| | | | | |
|---|---|---|---|---|
| 2013/0236167 A1* | 9/2013 | Tardieu | ............... | F16M 11/043 396/428 |
| 2014/0291457 A1* | 10/2014 | Rotheisler | .......... | F16M 11/2085 248/123.2 |
| 2015/0192241 A1* | 7/2015 | Shannahan | .......... | F16M 11/043 248/178.1 |

* cited by examiner

STABILIZED PLATFORM FOR CAMERA

BACKGROUND OF THE INVENTION

Field of the Invention

The invention is a stabilized platform for one or more cameras.

This invention relates to platforms for video cameras for rotation in multiple directions at a common intersection point of three rotational axes.

With the invention, a position and stability of the mounted video camera(s) can be controlled using a platform having center of mass of a stabilizing part coinciding with rotational axes.

Description of the Related Art

U.S. patent application Ser. No. 12/669,480 and Chinese patent application No. 20111380351.6 describes mechanisms in which a video camera is located in the center of the rotating unit.

Locking elements for axes elements and servo drives are mounted on the sides.

The axes elements are fixed to the frames encircling the camera, making said frames quite large.

Large frames have disadvantages such as reduced structural rigidity, increased errors in the production and operation, increased loads on bearings.

An amplitude of oscillations of the video camera with a telephoto lens can be reduced by reducing frictional forces at the nodes of rotation.

This can be achieved by increasing manufacturing accuracy of the axial units and reducing bearings loads.

FIG. 4 shows the prior art, where the stabilized platform has a rotating load (15), a frame (16), a position of a first bearing (17), a position of a second bearing (18), where the direction of gravitational force (19) is equal to the mass of a rotatable load (15).

In the illustrated prior art, a bearing is being loaded by proportional load (20), the distance between bearings is L1 and the distance of the lever arm is L2.

BRIEF SUMMARY OF THE INVENTION

Purpose of the invention is to reduce friction forces of rotational parts between an unstable base and a stable platform and to increase rigidity of the overall construction.

The above-mentioned disadvantages are overcome by the use of a compact unit of rotation, locating a video camera at the side and balancing the video camera by a counterweight on an opposite side of the axial unit.

DETAILED DESCRIPTION OF THE PREFERRED EMBODIMENTS

Figure 1:
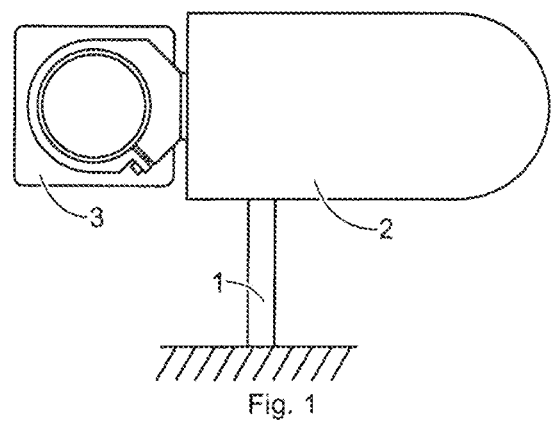
FIG. 1 shows front view of an example of the structure for stabilizing a platform.
Figure 2:
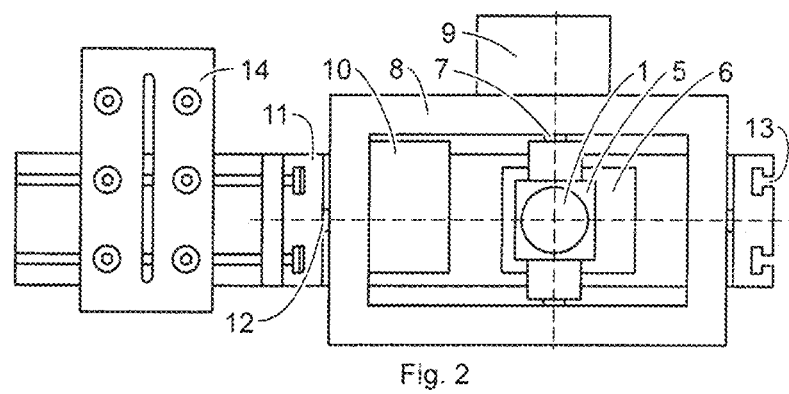
FIG. 2 shows top view of an axial unit.
Figure 3:
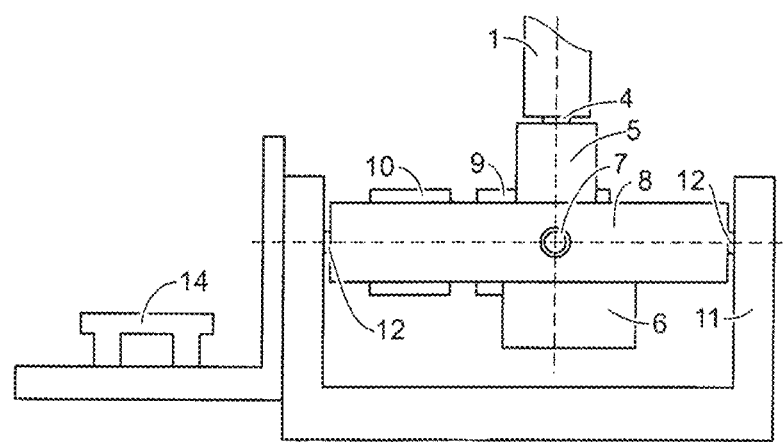
FIG. 3 shows side view of an axial unit.
Figure 4:
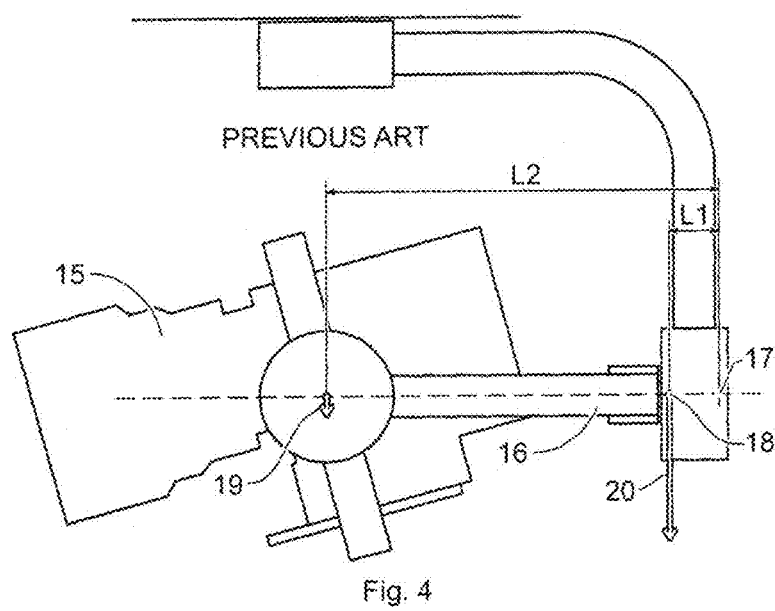
FIG. 4 shows a prior art device.

With reference to FIGS. 1-3, the stabilized platform includes a leg (1), a housing (2), and an adjustable platform (14) supporting and stabilizing a video camera (3). With reference to FIGS. 2-3, the stabilized platform provides a gimbal with three controlled axes of rotation.

The stabilized platform further includes an axial unit with: i) a first connector (4) located on a first axis of rotation (4) called a panoramic rotation axis (4) which extends along a length of the leg (1),
ii) two second connectors (7) located on a second axis of rotation (7) called a transverse tilting axis (7), and iii) two third connectors (12) located on a third axis of rotation (12) called a longitudinal inclination axis.

The first, second, and third axes of rotation intersect at a common intersection point. The second axis of rotation (7) and the third axis of rotation (12) are perpendicular one to another As shown in FIGS. 2-3, the axial unit further includes a horizontally rotating unit (5), a servo drive unit (6, 9, 10) comprised of a first servo drive (6), a second servo drive (9), and a third servo drive (10).

The horizontally rotating unit (5) is connected to the leg (1) and rotates around the first axis of rotation (4). The first connector (4) connects the horizontally rotating unit (5) to the leg (1). The horizontally rotating unit (5) rotates horizontally, around the first axis of rotation (7), when the first axis of rotation (4) extending along a length of the leg (1) extends vertically.

As shown in FIGS. 2-3, the axial unit still further includes a transversely tiltable frame (8), and a longitudinally tiltable frame (11).

The transversely tiltable frame (8) extends in a direction of the second axis of rotation (7) and in a direction of the third axis of rotation (12). The transversely tiltable frame (8) is tiltable in a transverse plane.

As shown in FIG. 2, in top view the transversely tiltable frame (8) is a closed rectangle comprised of four connected sides.

The two second connectors (7) connect two opposite sides of the horizontally rotating unit (5) to two opposite sides of the transversely tiltable frame (8) such that the transversely tiltable frame (8) is rotatable about the second axis of rotation (7).

As shown in FIG. 3, in side view the longitudinally tiltable frame (11) has a U-shape and comprises two arms jointed by a member (the lower member in FIG. 3 extending along a direction of the transversely tiltable frame (8).

The two arms each have a free end (the upper ends in FIG. 3). The two third connectors (12) connect inner sides of the arms of the longitudinally tiltable frame (11) to opposite ends of the transversely tiltable frame (8) such that the longitudinally tiltable frame (11) rotates around the third axis of rotation (12).

Outside faces of each of the arms of the longitudinally tiltable frame (11) include mounting slots (13) for fastening equipment for stabilization, as shown in FIG. 2. The mounting slots (13) rotate around the third axis of rotation (12).

An adjustable platform (14), for stabilized equipment, is shown in FIGS. 2-3 as being mounted to the mounting slots (13) of the left arm of the longitudinally tiltable frame (11).

The housing (2) is mounted to the transversely tiltable frame (8).

The axial unit, via the leg (1), may be supported to an unstable base. The leg (1) can be directed upwards (as shown in FIG. 1) or downwards and is rotatable about the first axis of rotation (4).

The first servo drive (6) is mounted on a first side of the horizontally rotating unit (5). The first connector (5) connects the leg (1) to an opposite, second side of the horizontally rotating unit (5).

The second servo drive (9) is secured on an outside of the transversely tiltable frame (8), whereas the third servo drive (10) is secured on an inside of the transversely tiltable frame (8).

The third element (12) is mounted on the longitudinally tiltable frame (11).

The platform (14) for stabilized equipment allows to a user to relocate the equipment in three directions to achieve precise balance of a rotating mass.

With reference again to FIG. 1, the video camera (3) is mounted on one side of the device.

On the opposite side, a position sensor of the stabilized platform, a servo drive controller, and a battery are secured.

The servo drive unit is further equipped with internal feedback of the acting force. A mechanical gyroscope may be used to achieve even greater stabilization.

Installation of two cameras on opposite sides allows stereoscopic shooting.

The above described structure of the stabilized platform for rotation and stabilization of a mounted video camera allows for production of a compact axial unit with increased rigidity and precision.

The invention's stabilized platform allows a center of mass of rotation to be situated between two bearings, thus a load on these two bearings does not exceed a weight of the load.

By reducing frictional forces, vibrations of the unstable base transmitted to the stabilized platform are also reduced.

Additionally, centers of mass of the stabilized equipment are spaced apart, enhancing the effect of additional inertial stabilization.

Areas of application include portable stabilizers for operators, installation of cameras on vehicles, cranes and cables, and unmanned machines.

The invention claimed is:

1. A stabilized platform for a video camera, the stabilized platform comprising:
   a gimbal with three controlled axes of rotation, the gimbal comprising
   a leg (1) which extends along a first axis of rotation (4) called a panorama rotation axis (4); and
   an axial unit comprised of
   i) a horizontally rotating unit (5) connected to the leg (1), the horizontally rotating unit (5) rotating around the first axis of rotation (4),
   ii) a transversely tiltable frame (8) that extends in a direction of a second axis of rotation (7) called a transverse tilting axis (7) and a third axis of rotation (12) called a longitudinal inclination axis, the transversely tiltable frame (8) being rotatable about the second axis of rotation (7) and being tiltable in a transverse plane,
   iii) a longitudinally tiltable frame (11) mounted to the transversely tiltable frame (8) such that the longitudinally tiltable frame (11) rotates around a third axis of rotation (12),
   wherein the first, second, and third axes of rotation intersect at a common intersection point,
   wherein outside opposite end surfaces of the longitudinally tiltable frame (11) include mounting slots (13) that rotate around the third axis of rotation (12), and
   iv) an adjustable platform (14) that mounts to the mounting slots (13) on each outside end surface of the longitudinally tiltable frame (11), the adjustable platform (14) being configured to mount the video as stabilized equipment (3).

2. The stabilized platform according to claim 1, further comprising first and second servo drives (9, 10) fixed to the transversely tiltable frame (8),
   wherein an axis (7) of the first servo drive (9) coincides with the second axis of rotation (7) and an axis (12) of the second servo drive (10) coincides with the third axis of rotation (12),
   wherein the second axis of rotation (7) and the third axis of rotation (12) are perpendicular one to another.

3. The stabilized platform according to claim 1, wherein the longitudinally tiltable frame (11) has a U-shape (11).

4. The stabilized platform according to claim 2, wherein the first and second servo drives include internal feedback and are used for rotation and stabilization.

5. The stabilized platform according to claim 1, further comprising first, second, and third servo drives (6, 9, 10), wherein,
   the first servo drive (6) is mounted on the horizontally rotating unit (5),
   an axis (4) of the first servo drive (6) coincides with the first axis of rotation (4),
   the second and third servo drives (9, 10) are fixed to the transversely tiltable frame (8), and
   an axis (7) of the second servo drive (9) coincides with the second axis of rotation (7) and an axis (12) of the third servo drive (10) coincides with the third axis of rotation (12), the second axis of rotation (7) and the third axis of rotation (12) being perpendicular one to another.

6. The stabilized platform according to claim 1, further comprising:
   a first connector (4) located on the first axis of rotation (4), the first connector (4) connecting the horizontally rotating unit (5) to the leg (1) such that the horizontally rotating unit (5) rotates around the first axis of rotation (4);
   two second connectors (7) located on the second axis of rotation (7), the two second connectors (7) connecting two opposite sides of the horizontally rotating unit (5) to two opposite sides of the transversely tiltable frame (8) such that the transversely tiltable frame (8) is rotatable about the second axis of rotation (7); and
   two third connectors (12) located on the third axis of rotation (12), the two third connectors (12) connecting inner sides of the arms of the longitudinally tiltable frame (11) to opposite ends of the transversely tiltable frame (8) such that the longitudinally tiltable frame (11) rotates around the third axis of rotation (12).

7. The stabilized platform according to claim 6, wherein a first servo drive (6) is mounted on a first side of the horizontally rotating unit (5), and the first connector (5) connects the leg (1) to an opposite, second side of the horizontally rotating unit (5).

8. The stabilized platform according to claim 6, wherein the horizontally rotating unit (5) rotates horizontally, around the first axis of rotation (7), when the first axis of rotation (4) extending along a length of the leg (1) extends vertically.

9. The stabilized platform according to claim 7, further comprising a second servo drive (9) and a third servo drive (10), wherein,
   the second servo drive (9) is secured on an outside of the transversely tiltable frame (8), and
   the third servo drive (10) is secured on an inside of the transversely tiltable frame (8).

10. The stabilized platform according to claim 9, wherein the horizontally rotating unit (5) rotates horizontally, around the first axis of rotation (7), when the first axis of rotation (4) extending along a length of the leg (1) extends vertically.

11. A stabilized platform for a video camera, the stabilized platform comprising:
- a leg (1) which extends along a first axis of rotation (4); and
- an axial unit comprised of
  - i) a horizontally rotating unit (5) connected to the leg (1), the horizontally rotating unit (5) rotating around the first axis of rotation (4),
  - ii) a transversely tiltable frame (8) that extends in a direction of a second axis of rotation (7) and a third axis of rotation (12), the transversely tiltable frame (8) being rotatable about the second axis of rotation (7),
  - iii) a longitudinally tiltable frame (11) having U-shape (11) and mounted to the transversely tiltable frame (8) such that the longitudinally tiltable frame (11) rotates around a third axis of rotation (12),
  - wherein the first, second, and third axes of rotation intersect at a common intersection point,
  - wherein each of the first, second, and third axes of rotation are controlled axes of rotation,
  - wherein outside opposite end surfaces of the longitudinally tiltable frame (11) include mounting slots (13) that rotate around the third axis of rotation (12), and
  - iv) a platform (14) that mounts to the mounting slots (13) on each outside end surface of the longitudinally tiltable frame (11), the platform (14) being configured to mount the video as stabilized equipment (3).

12. The stabilized platform according to claim 11, further comprising first and second servo drives (9, 10) fixed to the transversely tiltable frame (8),
- wherein an axis (7) of the first servo drive (9) coincides with the second axis of rotation (7) and an axis (12) of the second servo drive (10) coincides with the third axis of rotation (12), and
- wherein the second axis of rotation (7) and the third axis of rotation (12) are perpendicular one to another.

13. The stabilized platform according to claim 12, wherein the first and second servo drives include internal feedback and are used for rotation and stabilization.

14. The stabilized platform according to claim 12, further comprising first, second, and third servo drives (6, 9, 10), wherein,
- the first servo drive (6) is mounted on the horizontally rotating unit (5),
- an axis (4) of the first servo drive (6) coincides with the first axis of rotation (4),
- the second and third servo drives (9, 10) are fixed to the transversely tiltable frame (8), and
- an axis (7) of the second servo drive (9) coincides with the second axis of rotation (7) and an axis (12) of the third servo drive (10) coincides with the third axis of rotation (12), the second axis of rotation (7) and the third axis of rotation (12) being perpendicular one to another.

15. The stabilized platform according to claim 11, further comprising:
- a first connector (4) located on the first axis of rotation (4), the first connector (4) connecting the horizontally rotating unit (5) to the leg (1) such that the horizontally rotating unit (5) rotates around the first axis of rotation (4);
- two second connectors (7) located on the second axis of rotation (7), the two second connectors (7) connecting two opposite sides of the horizontally rotating unit (5) to two opposite sides of the transversely tiltable frame (8) such that the transversely tiltable frame (8) is rotatable about the second axis of rotation (7); and
- two third connectors (12) located on the third axis of rotation (12), the two third connectors (12) connecting inner sides of the arms of the longitudinally tiltable frame (11) to opposite ends of the transversely tiltable frame (8) such that the longitudinally tiltable frame (11) rotates around the third axis of rotation (12).

16. The stabilized platform according to claim 15, wherein a first servo drive (6) is mounted on a first side of the horizontally rotating unit (5), and the first connector (5) connects the leg (1) to an opposite, second side of the horizontally rotating unit (5).

17. The stabilized platform according to claim 15, wherein the horizontally rotating unit (5) rotates horizontally, around the first axis of rotation (7), when the first axis of rotation (4) extending along a length of the leg (1) extends vertically.

18. The stabilized platform according to claim 16, further comprising a second servo drive (9) and a third servo drive (10), wherein,
- the second servo drive (9) is secured on an outside of the transversely tiltable frame (8), and
- the third servo drive (10) is secured on an inside of the transversely tiltable frame (8).

19. The stabilized platform according to claim 18, wherein the horizontally rotating unit (5) rotates horizontally, around the first axis of rotation (7), when the first axis of rotation (4) extending along a length of the leg (1) extends vertically.

* * * * *